United States Patent Office 3,509,139
Patented Apr. 28, 1970

3,509,139
THIAZINOBENZOTHIAZINE ALKYL SULFONIUM SALTS
Betty H. Tarnowski, Midland, Mich., assignor to The Dow Chemical Company, Midland, Mich., a corporation of Delaware
No Drawing. Filed June 3, 1968, Ser. No. 733,760
Int. Cl. C07d 93/12
U.S. Cl. 260—243                 6 Claims

ABSTRACT OF THE DISCLOSURE

Disclosed is the disulfonium ditetrafluoroborate salt of 2,3,5,6-tetrahydro - (1,4) - thiazino-(4,3,2-de)(1,4)-benzothiazine wherein each of the ring sulfur atoms bears a lower alkyl group and the methyl and methoxy substituted derivatives thereof. These compounds are useful as fungicides.

The present invention relates to certain novel and useful thiazinobenzothiazine alkyl sulfonium salts and, more particularly, the disulfonium ditetrafluoroborate salts of S,S'-di(lower)alkyl - 2,3,5,6 - tetrahydro-(1,4)-thiazino-(4,3,2-de)(1,4)-benzothiazines. These compounds can be represented by structural Formula I:

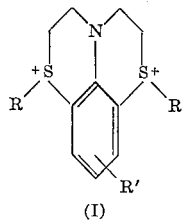

(I)

In this and succeeding formulas, R represents lower alkyl and R' represents hydrogen, methyl, or methoxy.

As employed in the present specification and claims, the term "lower alkyl" denotes the methyl, ethyl, isopropyl, and t-butyl alkyl groups.

The compounds of the present invention are crystalline solids and are soluble in water and somewhat soluble in organic solvents. They are useful as fungicides for the control of a wide variety of fungal organisms including those which attack or thrive on various plant species. Representative thiazinobenzothiazine alkyl sulfonium salts of the present invention include the following:

2,3,5,6-tetrahydro-8-methoxy - (1,4) - thiazino-(4,3,2-de) (1,4)-benzothiazine-1,7-di(ethyl tetrafluoroborate),
2,3,5,6 - tetrahydro - 9 - methyl-(1,4)-thiazino-(4,3,2-de) (1,4)-benzothiazine - 1,7 - di(isopropyl tetrafluoroborate),
2,3,5,6-tetrahydro-8-methoxy - (1,4) - thiazino-(4,3,2-de) (1,4)-benzothiazine - 1,7 - di(isopropyl tetrafluoroborate),
2,3,5,6-tetrahydro-9-methoxy - (1,4) - thiazino-(4,3,2-de) (1,4)-benzothiazine-1,7-di(methyl tetrafluoroborate),
2,3,5,6-tetrahydro-9-methoxy - (1,4) - thiazino-(4,3,2-de) (1,4) - benzothiazine-1,7-di(t-butyl tetrafluoroborate), and
2,3,5,6 - tetrahydro - 8 - methyl-(1,4)-thiazino-(4,3,2-de) (1,4)-benzothiazine-1,7-di(t-butyl tetrafluoroborate).

The novel thiazinobenzothiazine alkyl sulfonium salts hereof are prepared by reacting together 2,3,5,6-tetrahydro-(1,4)-thiazino-(4,3,2-de)(1,4)-benzthiazine of Formula II:

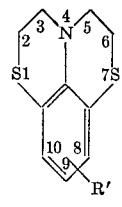

(II)

and a tri(lower)alkyl oxonium tetrafluoroborate of the Formula III:

$$R_3O^+BF_4^-$$  (III)

Conveniently, the reaction between the 2,3,5,6-tetrahydro-(1,4)-thiazino-(4,3,2-de)(1,4) - benzothiazine and the tri(lower)alkyl oxonium tetrafluoroborate is carried out in a liquid reaction medium which is inert to and does not compete with the reactants. Representative media for such purposes include methylene chloride, chloroform, carbon tetrachloride and the like. The reaction proceeds smoothly at the temperature range of from 0° C. to 100° C. and, preferably, at the boiling point of the reaction mixture and under reflux. The amounts of the reactants to be employed are not critical, some of the desired products being obtained when employing any proportions of the reagents. However, the reaction consumes the reagents in the proportion of one mole of the thiazinobenzothiazine starting compound with two moles of the tri(lower)alkyl oxonium tetrafluoroborate, and the employment of such proportions or an excess of the tri-(lower)alkyl oxonium tetrafluoroborate in the amount of up to two to four moles or more of tri(lower)alkyl oxonium tetrafluoroborate is usually preferred.

In carrying out the reaction, the thiazinobenzothiazine starting compound, tri(lower)alkyl oxonium tetrafluoroborate and solvent, if employed, are mixed together in any convenient manner. In a preferred procedure, the tri(lower)alkyl oxonium tetrafluoroborate is added portionwise to the thiazinobenzothiazine dispersed in a liquid reaction medium. The mixing and contacting of such reagents is carried out at a temperature of from 0° C. to 100° C. and preferably at the boiling point and under reflux. Following the contacting of such reagents, the reaction mixture can be set aside for a period of time to ensure completion of the reaction. Upon completion of the reaction, the reaction mixture is conventionally processed to separate and isolate the desired products. Such include, for example, extraction, chromatography, recrystallization, filtration and so forth.

The following examples serve further to typify the nature of the present invention and the manner by which it can be practiced but, as such, are not to be construed as limitations upon the overall scope hereof.

EXAMPLE 1

2,3,5,6 - tetrahydro - (1,4) - thiazino-(4,3,2-de)(1,4)-benzothiazine (15.0 grams; 0.0718 mole) is dispersed in 500 milliliters of methylene chloride. To the resultant solution is added dropwise a solution of 47.9 grams (0.252 mole) of triethyloxonium tetrafluoroborate in 300 milliliters of methylene chloride at a rate such that the reaction mixture gently refluxes. Upon completion of the addition, the mixture is stirred at room temperature for one hour and the temperature then raised to the boiling point and maintained under reflux for 20 additional hours. Following this period, the reaction mixture is cooled in an ice bath which initiates the precipitation of white crystals. These are separated by filtration and found to melt at from 200° C. to 212° C. The filtrate is concentrated by evaporation to provide additional solid. The two crops are combined and washed successively with acetone, diethyl ether, methylene chloride and ethanol to obtain the desired 2,3,5,6 - tetrahydro - (1,4)-thiazino-(4,3,2-de)(1,4)-benzothiazine-1,7-di(ethyl tetrafluoroborate) product as white crystals melting at 212° C.

*Elemental analysis.*—Calculated for $C_{14}H_{21}B_2F_8NS_2$ (percent): C, 37.12; H, 4.80; N, 3.18. Found (percent): C, 38.05; H, 4.75; N, 3.18.

The fact that both sulfur atoms were ethylated, instead of the nitrogen atom and one sulfur atom, is established by the symmetry of the ethylene proton grouping between 3.4 and 4.5 p.p.m. in the N.M.R. spectrum.

EXAMPLE 2

2,3,5,6 - tetrahydro - (1,4)-thiazino - (4,3,2-de)(1,4)-benzothiazine (10 grams; 0.048 mole) and tri(isopropyl) oxonium tetrafluoroborate (22.2 grams; 0.015 mole) are reacted together in the manner set forth in Example 1 to give 2,3,5,6-tetrahydro - (1,4) - thiazino-(4,3,2-de)(1,4)-benzothiazine-1,7-di(isopropyl tetrafluoroborate). 2,3,5,6-tetrahydro - (1,4) - thiazino - (4,3,2-de)(1,4)-benzothiazine-1,7-di(n-propyl tetrafluoroborate) has a molecular weight of 469.1.

In a similar manner, other compounds of the present invention are prepared as follows:

2,3,5,6-tetrahydro - 9 - methyl - (1,4)-thiazino-(4,3,2-de)(1,4) - benzothiazine - 1,7-di(ethyl tetrafluoroborate) which has a molecular weight or 455.1 by reacting together 2,3,5,6-tetrahydro - 9-methyl-(1,4)-thiazino-(4,3,2-de)(1,4) - benzothiazine-1,7-di(isopropyl tetrafluorboate) borate.

2,3,5,6-tetrahydro - 8 - methoxy-(1,4)-thiazino-(4,3,2-de)(1,4) - benothiazine - 1,7-di(methyl tetrafluoroborate) which has a molecular weight of 443.1 by reacting together 2,3,5,6-tetrahydro-8-methoxy-(1,4)-thiazino-(4,3,2-de)(1,4)-benzothiazine and trimethyl oxonium tetrafluoroborate.

2,3,5,6 - tetrahydro - 8 - methyl-(1,4)-thiazino-(4,3,2-de) (1,4) - benzothiazone-1,7-di(isopropyl tetrafluoroborate) which has a molecular weight of 484.1 by reacting together 2,3,5,6-tetrahydro-8-methyl-(1,4)-thiazino-(4,3,2-de)(1,4)-benzothiazine and triisopropyl oxonium tetrafluoroborate.

2,3,5,6-tetra - (1,4) - thiazine-(4,3,2-de)(1,4)-benzothiazine-1,7-di(t-butyl tetrafluoroborate) which has a molecular weight of 497.2 by reacting together 2,3,5,6-tetrahydro-(1,4) - thiazino-(4,3,2-de)(1,4)-benzothiazine and tri(t-butyl)oxonium tetrafluoroborate.

2,3,5,6 - tetrahydro - 9 - methyl-(1,4)-thiazino-(4,3,2-de)(1,4) - benzothiazine-1,7-di(methyl tetrafluoroborate) which has a molecular weight of 427.1 by reacting together 2,3,5,6-tetrahydro-9-methyl-(1,4)-thiazino - (4,3,2-de)(1,4)-benzothiazine and trimethyl oxonium tetrafluoroborate.

The compounds of the present invention are useful as fungicides for the control of a number of such organisms such as the causative agent of potato blights, apple scab, *Staphylococcus aureus,* and so forth. For such uses, the unmodified compounds can be employed. The compounds can also be dispersed on a finely divided solid and employed as a dust. Also, such mixtures can be dispersed in water with or without the aid of a surface active dispersing agent and the resulting aqueous suspension employed as a spray, drench, or wash. In other procedures, the compounds are employed as toxic constituents in solvent solutions, oil-in-water or water-in-oil emulsions, or aqueous dispersions. Good results are obtained with methods employing and compositions containing fungicidal amounts of the novel compounds. These amounts can range, generally, from 50 to 10,000 parts of the compound or mixtures thereof per million parts by weight.

In representative operations, 2,3,5,6-tetrahydro-(1,4)-thiazino-(4,3,2-de)(1,4) - benzothiazine-1,7-di(ethyl tetrafluoroborate) gives a substantially complete control and kill of each of *Staphylococcus aureus, Escherichia coli, Candida albicans, Bacillus subtilis, Aerobacter aerogenes, Aspergillus terreus, Candida pelliculosa, Pullularia pullulans,* and *Salmonella typhosa* when such compound, as the sole toxicant, is separately applied, at a concentration of 500 parts per million by weight, to an agar support containing one of such organisms.

The thiazinobenzothiazine starting compounds are prepared by dissolving an N,N-bis(2-(substituted sulfonylthio)ethyl)aniline compound which corresponds to the formula:

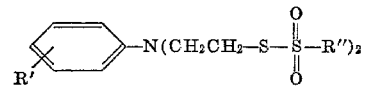

in which R″ represents lower alkyl, phenyl, or substituted phenyl in a polar organic solvent and thereafter heating the resulting solution at a temperature ranging from about 60° C. to about 130° C., preferably 70° to 100° C., to effect ring closure. In carrying out this method, the aniline compound is dispersed in a polar organic liquid such as ethanol or dimethylformamide, and the reaction thus formed is heated at a temperature within the cited temperature range for at least one hour and generally until the desired product mixture, as measured by convenient analytical techniques, is obtained. Following the heating period, the reaction, the reaction mixture is cooled to terminate the reaction. The desired product is then separated and recovered by such conventional techniques as filtration, decantation, extraction, chromatography, and the like.

The N,N-bis(2(substituted sulfonylthio)ethyl) aniline compounds are prepared by reacting a dihalo compound of the formula:

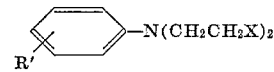

wherein X represents bromo or chloro with an alkali metal salt of a thiosulfonic acid of the formula:

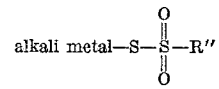

R″ being as above defined, in an organic reaction medium at temperatures of from 60° C. to 120° C. and preferably at the boiling point of the reaction mixture and under reflux. Following the reaction, the reaction mixture is filtered hot and the filtrate cooled to initiate precipitation of product which is removed by centrifugation, decantation, or filtration.

The tri(lower)alkyl oxonium tetrafluoroborate reactants are prepared, for example, by reacting together a boron trifluoride lower alkoxide, a lower alkyl ether, and epichlorohydrin in accordance with the following equation:

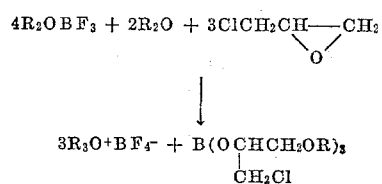

This reaction is conducted in one manner by adding a substantially equimolecular proportion (in comparison to the boron trifluoride lower alkoxide reactant) of epichlorohydrin to a solution of the boron trifluoride lower alkoxide in the $R_2O$ ether which serves both as reactant and reaction medium. The resultant mixture is then heated under an inert atmosphere to the boiling point and maintained at reflux with stirring for about an hour and then set aside at room temperature for a few hours. While preserving an inert atmosphere, the supernatant liquid is removed and the collected crystals are washed successively with ether to give the product.

The appropriate boron trifluoride(lower)alkoxide starting compound for this latter reaction is prepared by the reaction of $R_2O$ ether vapor and boron trifluoride vapor, the appropriate alkoxide condensing and collectable upon formation.

Alternatively, the tri(lower)alkyl oxonium tetrafluoroborate reactant can be prepared via a transfer or exchange reaction. Thus, the triethyl oxonium tetrafluoroborate can be prepared as above described and dispersed in an organic reaction medium such as methylene chloride. To this solution is then added a large excess of an $R_2O$ ether, such as dimethyl ether and the resultant mixture is allowed to stand at room temperature until crystallization is complete. Conventional collection and purification of the resultant crystals furnishes the desired product. For an example, trimethyl oxonium tetrafluoroborate is prepared when utilizing triethyl oxonium tetrafluoroborate and dimethyl ether.

What I claim is:

1. Disulfonium ditetrafluoroborate salt of 2,3,5,6-tetrahydro-(1,4)-thiazino-(4,3,2,-de)(1,4)-benzothiazine having the formula

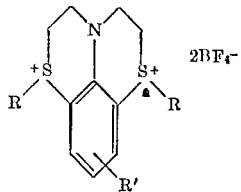

wherein each R is lower alkyl and R' is H, $CH_3$ or $OCH_3$.

2. The compound claimed in claim 1 which is 2,3,5,6-tetrahydro-(1,4)-thiazino-(4,3,2-de)(1,4)-benzothiazine-1,7-di(ethyl tetrafluoroborate).

3. The compound claimed in claim 1 which is 2,3,5,6-tetrahydro - 8 - methyl-(1,4)-thiazino-(4,3,2-de)(1,4)-benzothiazine-1,7-di(ethyl tetrafluoroborate).

4. The compound claimed in claim 1 which is 2,3,5,6-tetrahydro-8-methoxy - (1,4)-thiazino - (4,3,2-de)(1,4)-benzothiazine-1,7-di(ethyl tetrafluoroborate).

5. The compound claimed in claim 1 which is 2,3,5,6-tetrahydro - (1,4)-thiazino - (4,3,2-de)(1,4) - benzothiazine-1,7-di(methyl tetrafluoroborate).

6. The compound claimed in claim 1 which is 2,3,5,6-tetrahydro - (1,4)-thiazino - (4,3,2-de)(1,4)-benzothiazine-1,7-di(isopropyl tetrafluoroborate).

References Cited

UNITED STATES PATENTS

| | | | |
|---|---|---|---|
| 2,947,744 | 8/1960 | Lowrie | 260—243 |
| 3,042,671 | 7/1962 | Lombardino et al. | 260—243 |
| 3,148,188 | 9/1964 | Hoya | 260—243 |

JOHN D. RANDOLPH, Primary Examiner

J. M. FORD, Assistant Examiner

U.S. Cl. X.R.

260—453, 462, 606.5, 999